United States Patent [19]

Altermatt

[11] 3,915,972
[45] Oct. 28, 1975

[54] NEW VAT DYESTUFFS
[75] Inventor: Hans Altermatt, Reinach, Switzerland
[73] Assignee: Ciba-Geigy AG, Basel, Switzerland
[22] Filed: Jan. 10, 1974
[21] Appl. No.: 432,255

[30] Foreign Application Priority Data
Jan. 30, 1973 Switzerland.......................... 1326/73

[52] U.S. Cl................. 260/249; 8/54.2; 260/249.9
[51] Int. Cl.².................................... C07D 251/18
[58] Field of Search..................................... 260/249

[56] References Cited
UNITED STATES PATENTS
| | | | |
|---|---|---|---|
| 2,729,638 | 1/1956 | Joyce................................... | 260/249 |
| 2,800,468 | 7/1957 | Scalera et al. .................. | 260/249 X |
| 2,813,863 | 11/1957 | Joyce................................... | 260/249 |
| 2,832,779 | 4/1958 | Ebel et al........................ | 260/249 X |

Primary Examiner—John M. Ford
Attorney, Agent, or Firm—Joseph G. Kolodny; Prabodh I. Almaula; Edward McC. Roberts

[57] ABSTRACT

Vat dyestuffs of the formula

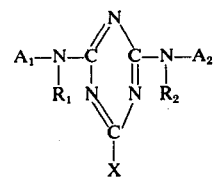

wherein X represents a nitrogen-containing heterocyclic radical which is bonded through a carbon atom, $R_1$ and $R_2$ each represent a hydrogen atom or a low molecular alkyl radical, and $A_1$ and $A_2$ represent a different or similar vattable radical with 3 to 6 condensed rings, are suitable for dyeing and printing the most varied materials, in particular to dyeing and printing fibres made from natural or regenerated cellulose in the presence of reducing agents.

3 Claims, No Drawings

NEW VAT DYESTUFFS

The present invention provides new vat dyestuffs of the general formula

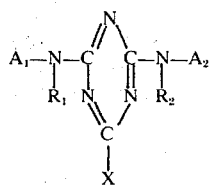

wherein X represents a nitrogen-containing heterocyclic radical which is bonded through a carbon atom, $R_1$ and $R_2$ each represent a hydrogen atom or a low molecular alkyl radical, and $A_1$ and $A_2$ represent a different or similar vattable radical with 3 to 6 condensed rings. Possible radicals $R_1$ and $R_2$ are alkyl groups with 1 to 4 carbon atoms, e.g. methyl, ethyl, propyl, or isopropyl groups, as well as preferably hydrogen atoms.

Possible vattable radicals $A_1$ and $A_2$ are radicals of polycyclic compounds, such as anthrapyramidines, anthrapyridones, anthrapyrimidones, azabenzanthrones, benzanthrones, anthranthrones, anthrimides, isothiazole-anthrones, pyrazoleanthrones, pyrimidanthrones, anthraquinone compounds which are derived from 9,10-dioxoanthracene and optionally contain further fused carbocyclic and heterocyclic rings, such as quinazoline-anthraquinones, oxazole-anthraquinines, thiazoleanthraquinones, oxadiazole-anthraquinones, pyrazoleanthraquinones, pyrazino-anthraquinones, and, preferably, 3,4-phthaloylacridones bonded in 2- or 8-position as well as radicals of anthraquinones bonded in 1- or 2-position. All these radicals can carry the customary substituents for vat dyestuffs. Examples of such substituents are: halogen atoms, in particular chlorine, fluorine, or bromine alkyl, alkoxy, aryl, aryloxy, aralkyl, aralkoxy, arylamino alkylmercapto, arylmercapto, cyano and thiacyano groups. Throughout this specification, the term "alkyl" refers in particular to radicals with 1 to 4 carbon atoms, and "aryl" denotes in particular radicals such as phenyl, tolyl, chlorophenyl, methoxyphenyl, or naphthyl radicals, and "aralkyl" means in particular the benzyl radical. Particularly important substituents are moreover the acyl and acylamino group. The term "acyl" comprises above all radicals of aromatic carboxylic or sulphonic acids, in particular those of the benzene series, or low molecular alkanoyl or alkylsulphonyl radicals (i.e. which contain from 1 to 4 carbon atoms), e.g. the acetyl, benzoyl, p-chlorobenzoyl, p-phenylbenzoyl, benzenesulphonyl or p-toluenesulphonyl radical, also low molecular carbalkoxy radicals and sulphonamide or carboxy amide groups the nitrogen atom of which can be substituted by alkyl or aryl radicals, e.g. the carboethoxy, carbamoyl or sulphamoyl radical.

Possible radicals represented by X are the radicals of the following N-heterocycles: pyridine, pyrimidine, pyridazine, pyrazine and quinoline, which can be substituted by alkyl, aralkyl, alkoxy, aryloxy, alkylamino, arylamino, alkylmercapto, arylmercapto or halogen atoms, in particular chlorine and bromine.

Particularly important dyestuffs are those in which X represents a pyridine radical which can have the substituents mentioned hereinabove.

Preferred dyestuffs are therefore those of the general formula

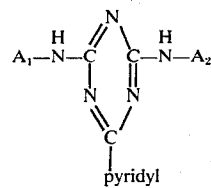

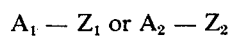
pyridyl wherein $A_1$ and $A_2$ represent an anthraquinone radical bonded in 1- or 2-position or a 3,4-phthaloylacridone radical bonded in 2- or 8-position, and $A_1$ and $A_2$ and the pyridine radical can carry the indicated substituents.

The dyestuffs are manufactured by reaction of 2 moles of a compound of the formula $$A_1 - Z_1 \text{ or } A_2 - Z_2$$

or of a mixture of both, with a triazine of the formula

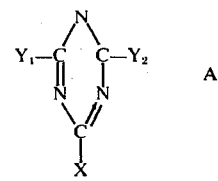  A wherein either $Z_1$ and $Z_2$ represent a halogen atom and $Y_1$ and $Y_2$ represent radicals of the formula $-NHR_1$ and $-NHR_2$, or $Z_1$ and $Z_2$ represent radicals of the formula $-NHR_1$ and $-NHR_2$ and $Y_1$ and $Y_2$ represent halogen atoms. Bromine and, preferably, chlorine are suitable halogen atoms. Consequently, 2 moles of a compound of the formula $A_1$-halogen or $A_2$-halogen, or any mixture of the two, are condensed with a compound of the general formula

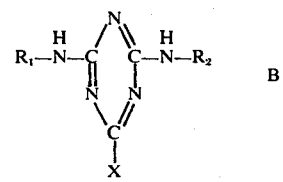  B or 2 moles of a compound of the formula $A_1-NHR_1$ or $A_2-NHR_2$, or any mixture of the two, with 1 mole of the compound of the general formula

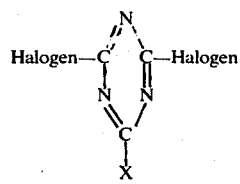

The mixture of the vattable compounds can be used simultaneously or stepwise. By means of such combinations it is possible to obtain mixed shades.

These methods of manufacture are widely known. If the first method is followed, $A_1$-halogen, $A_2$-halogen and diaminotriazine, it is advantageous to use a cul-pyridine catalyst as described in French Patent 1,603,058. In this case, examples of suitable starting materials $A_1$-halogen and $A_2$-halogen are haloanthraquinones, i.e. both α- and β-haloanthraquinones, for example:

1-chloroanthraquinone,
1,3-dichloroanthraquinone,
1,5-dichloroanthraquinone,
1,6-dichloroanthraquinone,
1,8-dichloroanthraquinone,
1-bromoanthraquinone,
1,5-dibromoanthraquinone,
1,8-dibromoanthraquinone,
2-chloroanthraquinone,
2,6-dichloroanthraquinone,
2,7-dichloroanthraquinone,
2-bromoanthraquinone,
2,6-dibromoanthraquinone,
2,7-dibromoanthraquinone,
1-chloro-5-acetylaminoanthraquinone,
1-chloro-4-benzoylaminoanthraquinone,
1-chloro-4-(p-chlorobenzoylamino)-anthraquinone,
1-bromo-4-benzoylaminoanthraquinone,
1-bromo-4-(4'-phenylbenzoylamino)-anthraquinone,
1-chloro-5-benzoylaminoanthraquinone,
1-chloro-5-(p-chlorobenzoylamino)-anthraquinone,
1-bromo-5-benzoylaminoanthraquinone,
1-chloro-2-methylanthraquinone,
1-chloro-4-methylanthraquinone,
1-chloro-4-methoxyanthraquinone,
1-bromo-2-methoxyanthraquinone,
1-bromo-4-methoxyanthraquinone,
1-chloro-3-acetyl-4-amino-anthraquinone,
1-chloro-4-anilido-anthraquinone,
1-chloro-4-phenylmercaptoanthraquinone,
1-chloro-5-phenylmercaptoanthraquinone,
2-chloro-3,4-phthaloylacridone,
2,5,7-trichloro-3,4-phthaloylacridone,
bz-1-chlorobenzanthrone,
bz-1-bromobenzanthrone,
6-bz-1-dichlorobenzanthrone,
6-bz-1-dibromobenzanthrone,
dichloroanthranthrone,
dibromoanthranthrone,
dibromobenzpyrenquinone,
tribromopyranthrone.

Suitable diaminotriazines are e.g. those of the formula $$H_2N-C\underset{N}{\overset{N}{\diagup}}\overset{N}{\underset{C}{\diagdown}}C-NH_2$$
$$\underset{X}{|}$$

wherein
X= 2-pyridyl,
3-pyridyl,
4-pyridyl,
5-ethyl-2-pyridyl,
2-chloro-3-pyridyl,
4-methyl-3-pyridyl,
2-chloro-4-pyridyl,
2-methyl-4-pyridyl,
2,6-dimethyl-4-pyridyl,
2-propyl-6-chloro-4-pyridyl
2-pyrimidyl,
4-pyrimidyl,
5-pyrimidyl, If dihalotriazines and compounds of the formula $A_1$—$NHR_1$ or $A_2$—$NHR_2$ are used as starting materials, then instead of the haloanthraquinones there are used by analogy the corresponding α- or β-aminoanthraquinones, for example:

1-aminoanthraquinone,
1-amino-4-methoxyanthraquinone,
1-amino-4-acetylaminoanthraquinone,
1-amino-4-benzoylamino-anthraquinone,
1-amino-4-(p-tolylsulphonylamino-anthraquinone,
1-amino-4-(p-chlorobenzoylamino)-anthraquinone,
1-amino-4-anilido-anthraquinone,
1-amino-4-[p-(N,N-dimethylsulphamido)-benzoylamino]-anthraquinone,
1-amino-4-phenylmercapto-anthraquinone,
1-amino-4-(4'-phenyl-benzoylamino)-anthraquinone,
1-amino-4-chloroanthraquinone, as well as the corresponding 1-aminoanthraquinones which are substituted in the 5- or 8-position instead of in 4-position.

2-amino-anthriquinone,
1-amino-2-methyl-anthraquinone,
1-amino-3-chloro-anthraquinone,
1-amino-6,7-dichloro-anthraquinone,
1-amino-6-phenylmercapto-anthraquinone,
1-amino-7-phenylmercapto-anthraquinone,
1-amino-6-chloro-7-phenylmercapto-anthraquinone,
1-amino-7-chloro-6-phenylmercapto-anthraquinone,
1,4-diamino-2-acetyl-anthraquinone,
2-amino-3-chloro-anthraquinone,
2-amino-4-chloro-anthraquinone,
1-amino-2-chloro-anthraquinone,
1-amino-6-chloro-anthraquinone,
1-amino-3-chloro-6-methyl-anthraquinone,
1-amino-2-methyl-3-chloro-anthraquinone,
1-amino-7-chloro-anthraquinone,
2-amino-3,4-phthaloylacridone,
2-amino-6- or 7-chloro-3,4-phthaloylacridone,
2-amino-6-trifluoromethyl-3,4-phthaloylacridone,
2-amino-5,7-dichloro-3,4-phthaloylacridone,
2-amino-1,7-dichloro-3,4-phthaloylacridone,
8-amino-5-chloro-3,4-phthaloylacridone,
7-amino-1,2-benzo-5,6-phthaloylacridone,
aminoanthranthrone,
aminoisothiazolanthrone Examples of suitable dihalotriazines, wherein "hal" represents chlorine or bromine, are:

$$hal-C\underset{N}{\overset{N}{\diagup}}\overset{N}{\underset{C}{\diagdown}}C-hal$$
$$\underset{X}{|}$$

in which X has the same meaning as given for the diaminotriazines cited hereinbefore.

The products according to the invention are suitable for dyeing and printing the most varied materials, in particular for dyeing and printing fibres made from natural or regenerated cellulose in the presence of reducing agents, e.g. dithionite.

The dyeing which are obtained are characterised by outstanding levelling properties. The fastness properties are in general very good, in particular the fastness to light, water, chlorine, and to boiling soda. The new dyestuffs reserve polyester fibres well or stain them tone, in tone, which makes them suitable for dyeing fibre blends in admixture with disperse dyestuffs.

Compared with known comparable dyestuffs, which instead of a heterocyclic radical, in particular the pyridyl radical, contain a phenyl radical bonded to the s-triazine ring, the dyestuffs of the present invention are characterised by a reduced fibre damaging action in light.

The new dyestuffs can also be used as pigments. On account of their favourable properties, they can be used for the most diverse forms of pigment application, e.g. in finely divided form for colouring rayon and viscose, or cellulose ethers or esters, or polyamides or polyurethanes or polyesters in the spinning melt, as well as for the production of coloured lacquers or lake formers, solutions or products from acetyl cellulose, nitrocellulose, natural resins or artificial resins, such as polymerisation resins or condensation resins, e.g. aminoplasts, alkyd resins, phenolic plastics, polyolefins, such as polystyrene, polyvinyl chloride, polyethylene, polypropylene, polyacrylonitrile, rubber, casein, silicone and silicone resins. Furthermore, it is also possible to use them with advantage in the manufacture of coloured pencils cosmetic preparations, or laminated sheets.

The following Examples illustrate the invention, the parts being parts by weight unless otherwise stated.

EXAMPLE I

A solution of 0.55 parts of copper (I) iodide in 3 parts of pyridine is added to a suspension consisting of 10 parts of 1-chloroanthraquinone, 3.75 parts of 2,4-diamino-6-(4'-pyridyl)-s-triazine, and 5.3 parts of sodium carbonate in 70 parts of nitrobenzene and the whole is stirred over the course of 1 hour at 180°–185°C. The mixture is subsequently stirred for 4 hours at this temperature. The reaction mass is cooled to 80°C, filtered, and the residue is thoroughly washed with nitrobenzene, then with methanol and water. Any copper present is removed by stirring the yellow dyestuff in dilute nitric acid for one-half hour at 80°C. It is then filtered off, washed neutral, and dried. Yield: 11.2 parts of a yellow dyestuff of the formula

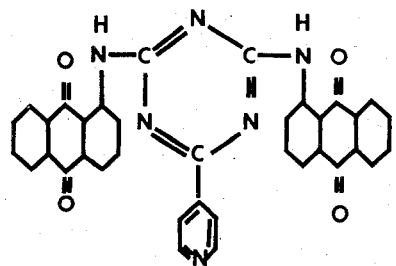

It dyes cotton from a hydrosulphite vat in yellow shades with good fastness properties.

Dyestuffs with similar properties are obtained by substituting for the 3.75 parts of 2,4-diamino-6-(4'-pyridyl)-s-triazine the number of parts indicated in column I of the following Table of the compounds listed in column II.

TABLE I

| I | II |
|---|---|
| 3,75 | 2,4-diamino-6-(2'-pyridyl)-s-triazine |
| 3,75 | 2,4-diamino-6-(3'-pyridyl)-s-triazine |
| 4,1 | 2,4-diamino-(4'-methyl-3'-pyridyl)-s-triazine |
| 4,4 | 2,4-diamino-(2'-chloro-3'-pyridyl)-s-triazine |
| 3,8 | 2,4-diamino-(5'-pyrimidyl)-s-triazine |

EXAMPLE 2

By substituting for the 10 parts of 1-chloroanthraquinone in Example 1 the amount indicated in column I of the following Table of the anthraquinones listed in column II, there are obtained dyestuffs which from the vat dye cotton in the shades listed in column III.

TABLE II

| I | II | III |
|---|---|---|
| 11,2 | 1-bromoanthraquinone | yellow |
| 10,0 | 2-chloroanthraquinone | yellow |
| 15,1 | 1-chloro-4-benzoylamino-anthraquinone | red |
| 15,35 | 1-chloro-4-(p-chlorobenzoylamino)- " | red |
| 15,1 | 1-chloro-5-benzoylamino-anthraquinone | golden-yellow |
| 15,35 | 1-chloro-5-(p-chlorobenzoylamino)- " | golden-yellow |
| 10,6 | 1-chloro-4-methyl-anthraquinone | yellow |
| 11,2 | 1-chloro-4-methoxy-anthraquinone | orange |
| 12,4 | 1-bromo-4-methoxy-anthraquinone | orange |
| 12,4 | 1-chloro-3-acetyl-4-amino-anthraquinone | blue |
| 13,8 | 1-chloro-4-anilido-anthraquinone | blue |
| 14,5 | 1-chloro-5-phenylmercapto-anthraquinone | yellow |
| 14,8 | 2-chloro-3,4-phthaloylacridone | blue |
| 16,25 | 1-bromo-4-benzoylamino-anthraquinone | red |

In place of the diaminotriazine mentioned in Example 1, it is also possible to use with equal success the compounds listed in Table 1.

EXAMPLE 3

11.4 parts of 1,3-dichloroanthraquinone and 3.75 parts of 2,4-diamino-6-(3'-pyridino)-s-triazine are stirred for 4 hours at 185°C in the presence of 5.3 parts of sodium carbonate, 1 part of copper (I) iodide and 4 parts of pyridine in 70 parts of nitrobenzene. The resulting yellow dyestuff is filtered off at 80°C and processed as described in Example 1 to yield 12 parts of the dyestuff of the formula

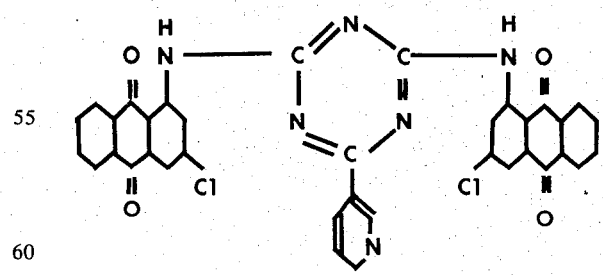

The dyestuff, which is treated in the conventional manner with sodium hypochlorite, dyes cotton from the vat in brilliant greenish yellow shades which are fast to light and wet treatments.

A dyestuff is obtained which dyes cotton from the vat in neutral yellow shades by substituting 11.4 parts of 1,6- or 1,7-dichloroanthraquinone for the 11.4 parts of 1,3-dichloroanthraquinone.

Dyeing Instruction I

1 Part of dyestuff is vatted at 50°–70°C with 10 parts by volume of sodium hydroxide having a specific gravity of 36° Be and 5 parts of sodium hydrosulphite in 200 parts of water. The above stock vat is added to a dyebath which contains in 2000 parts of water 5 parts by volume of sodium hydroxide solution with a specific gravity of 36° Be and 3.7 parts of sodium hydrosulphite. 100 parts of cotton are put into this dyebath at 40°C. After 10 minutes, 15 parts of sodium chloride are added and after 20 minutes, a further 15 parts and dyeing is carried out for 45 minutes at 40°C. The cotton is then squeezed out, oxidised, and finished in the conventional manner.

Dyeing Instruction II 1 part of the dyestuff obtained according to Example 1 and 0.5 part of CI Disperse Yellow 84 are ground wet with 2.5 parts of a 50% aqueous solution of the sodium salt of dinaphthylmethane-disulphonic acid. A dyebath is prepared with this dyestuff preparation, 2 parts of ammonium sulphate, and 1000 parts of water, and the pH is adjusted to 6.0–6.9 with monosodium phosphate.

100 parts of a blended fabric of cotton/polyester (67% polyester) are put into this bath, which is heated to 120°–125°C over the course of 45 minutes. Dyeing is carried out at this temperature for 60 minutes in a sealed vessel. The dyebath is then cooled to 60°–70°C and 20 parts by volume of sodium hydroxide solution of Be 36° and 5 parts of sodium hydrosulphite are added. After 45 minutes, the fabric is sequeezed out, oxidised, and finished in the usual manner. A blended fabric dyed yellow is obtained.

Pigment coloration

5 Parts of the dyestuff mentioned in Example 1 are mixed with 95 parts of dioctyl phthalate and ground in a ball mill until the dyestuff particles are smaller than 3μ.

0.8 part of this dioctyl phthalate paste is mixed with 13 parts of polyvinyl chloride, 7 parts of dioctyl phthalate and 0.1 part of cadmium stearate, and this mixture is then rolled to and fro for 5 minutes in a twin roller mill at 140°C.

A yellow coloured material having good migration properties and good fastness to light is obtained.

Coloration of lacquers a. Nitrocellulose lacquer

40 Parts of a nitrocellulose lacquer, 2.375 parts of titanium dioxide and 0.125 part of the dyestuff of Example 1 were ground in a rod mill for 16 hours. The resulting lacquer is applied in a thin layer to aluminium foil. It gives a golden yellow coloration having excellent fastness to light.

b. Alkyd varnish 10 g of titanium dioxide and 2 g of the pigment manufactured according to Example 2 (No. 3 of the Table) are ground for 48 hours in a ball mill with a mixture consisting of 26.4 g of coconut alkyl resin, 24.0 of melamine formaaldehyde resin (50% solids content), 8.8 g of ethylene glycol monomethyl ether, and 28.8 g of xylene.

By spraying this varnish on an aluminium sheet, drying it for 30 minutes at room temperature and then stoving it for 30 minutes at 120°C, there is obtained a clear red finish of good tinctorial strength which is characterised by good fastness to crosslacquering, outstanding fastness to light, and good resistance to weathering.

I claim:

1. A vat dyestuff of the formula

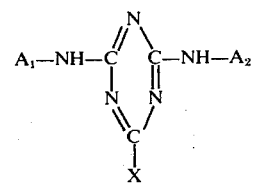

wherein X is pyridyl or pyridyl substituted by alkyl of 1 to 4 carbon atoms or is pyrimidyl, which is bound through a carbon atom, and $A_1$ and $A_2$ each is independently anthraquinonyl or anthraquinonyl substituted by halo, alkyl of 1–4 carbon atoms, alkoxy of 1–4 carbon atoms, alkanoyl of 1–4 carbon atoms, amino, alkanoylamino of 1–4 carbon atoms, phenylamino, benzoylamino, p-chlorobenzoylamino, phenylmercapto, p-tolylsulphonylamino, p-(N,N-dimethylsulphamido) benzoylamino, or p-(phenyl)benzoylamino; or is 3,4-phthaloylacridonyl or said phthaloylacridonyl substituted by halo or trifluoromethyl, and bonded via the 2- or 8-position.

2. A vat dyestuff as claimed in claim 1, wherein X is pyridyl, and $A_1$ and $A_2$ is anthraquinonyl or anthraquinonyl substituted by halo, alkyl of 1–4 carbon atoms, alkoxy of 1–4 carbon atoms, alkanoyl of 1–4 carbon atoms, amino, phenylamino, benzoylamino, p-chlorobenzoylamino or phenylmercapto; or is 3,4-phthaloylacridonyl which is bonded via the 2- or 8-position.

3. A dyestuff as claimed in claim 2 of the formula

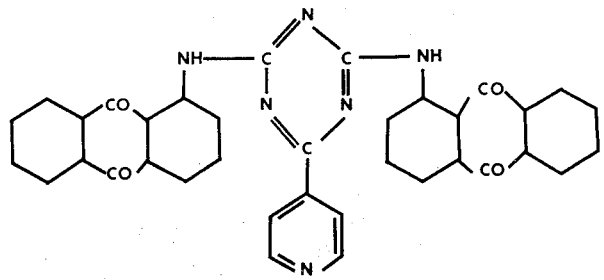

* * * * *